(12) United States Patent
Der et al.

(10) Patent No.: US 11,907,194 B2
(45) Date of Patent: Feb. 20, 2024

(54) SYSTEMS AND METHODS FOR EXECUTING AND HASHING MODELING FLOWS

(71) Applicant: Capital One Services, LLC, McLean, VA (US)

(72) Inventors: Bryan Der, Richmond, VA (US); Steven Devisch, Reston, VA (US); Justin Essert, Richmond, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 197 days.

(21) Appl. No.: 17/518,482

(22) Filed: Nov. 3, 2021

(65) Prior Publication Data

US 2023/0133422 A1 May 4, 2023

(51) Int. Cl.
*G06F 7/00* (2006.01)
*G06F 16/22* (2019.01)
*G06F 16/2458* (2019.01)

(52) U.S. Cl.
CPC ...... *G06F 16/2255* (2019.01); *G06F 16/2474* (2019.01)

(58) Field of Classification Search
CPC ............. G06F 16/2255; G06F 16/2474; G06F 16/2443

USPC ......................................... 707/737, 747, 810
See application file for complete search history.

(56) References Cited

U.S. PATENT DOCUMENTS

| | | | |
|---|---|---|---|
| 9,753,751 B2 | 9/2017 | Atterbury et al. | |
| 10,116,670 B2 | 10/2018 | Muddu et al. | |
| 11,726,818 B1 * | 8/2023 | Sutton | G06F 9/30043 718/102 |
| 2016/0373792 A1 * | 12/2016 | Meyer | H04N 21/812 |
| 2021/0294655 A1 * | 9/2021 | Bharathi | G05B 17/02 |

* cited by examiner

*Primary Examiner* — Md I Uddin
(74) *Attorney, Agent, or Firm* — TROUTMAN PEPPER HAMILTON SANDERS LLP; Christopher J. Forstner; John A. Morrissett

(57) ABSTRACT

The disclosed systems and methods can comprise executing a modeling sequence comprising a first model and a second model, obtaining a first result from the first model being used as an input for the second model to obtain a second result, hashing data representative of a first configuration and a second configuration to create a first hash and a second hash, respectively, storing the first result in a first location and the second result in a second location, receiving one or more configuration changes to the second model thereby creating a third configuration associated with the second model, hashing data representative of the third configuration to create a third hash, receiving a request to rerun the modeling sequence, determining that the first configuration is associated with the first model, and providing the first result to the second model without rerunning the first model.

9 Claims, 7 Drawing Sheets

SYSTEMS AND METHODS FOR EXECUTING AND HASHING MODELING FLOWS

FIELD OF THE DISCLOSURE

The present disclosure relates generally to systems and methods for executing and hashing modeling flows; and particularly, to systems and methods for reducing modeling sequence runtimes by hashing modeling flows.

BACKGROUND

Predictive modeling and the subsequent harnessing of computational power has become a more and more ubiquitous part of doing business, extending to everyday activities. In predictive modeling, a sequence of models is often used to obtain more robust results and simulations. The more models that are in the sequence, the more accurate the result can be. For instance, the field of weather forecasting often relies on the aggregate result of a sequence or series of models based on different parameters and conditions. If the parameters fed to the models change, the models are re-run and return different results, thus changing the forecast. Similar techniques are used in the accounting and financial industries to help inform business decisions.

In the world of business analysis, the model sequences often employ sequential runs of models. That is, the results of one model will feed into a second model, and the results of the second model will feed into a third model, and so on. This allows each of the models related to different scenarios to offer a more accurate prediction or simulation. Models can also be designed to tackle a subset of a problem rather than different scenarios. For example, one model could forecast the path of a hurricane, and a second model could forecast the strength of that hurricane given that it will follow the path forecasted by the first model. Each model in the sequence can have different assumptions or parameters. However, executing the models sequentially consumes time and computing power. Each run through the sequence costs computing time and, therefore, money. Furthermore, if the inputs or parameters of one model in the sequence are changed, the change will propagate through the sequence because each model feeds its results into the next model in the sequence. Therefore, the whole sequence will need to be re-run to accommodate the change in configuration.

What is needed, therefore, are systems and methods that can determine if model parameters/configurations have changed, and thus can determine which models in a sequence of models need to be re-run without re-running the entire sequence of models. Embodiments of the present disclosure address this need as well as other needs that will become apparent upon reading the description below in conjunction with the drawings.

BRIEF SUMMARY OF THE INVENTION

The present disclosure relates generally to systems and methods for executing and hashing modeling flows; and particularly, to systems and methods for reducing modeling sequence runtimes by hashing modeling flows.

An example of the present disclosure can provide a method of reducing modeling sequences, the method including executing a modeling sequence having a first model to obtain a first result, hashing data representing a first configuration associated with the first model to create a first hash, storing the first result in a first location pointed to by the first hash, receiving one or more configuration changes to the first model thereby creating a second configuration associated with the first model, hashing data representing the second configuration associated with the first model to create a second hash pointing to a second location, receiving a request to rerun the modeling sequence having the first model, determining that the second location is empty, executing the modeling sequence having the first model to obtain a second result, and storing the second result in the second location.

Another example of the present disclosure can provide a method of reducing modeling sequences, the method including executing a modeling sequence having a first model to obtain a first result, hashing data representing a first configuration associated with the first model to create a first hash, storing the first result in a first location, the first hash pointing to the first location in the database, receiving a request to rerun the modeling sequence comprising the first model, determining that the first configuration is associated with the first model and that the first hash points to the first result in the first location, and returning the first result without rerunning the first model.

Another example of the present disclosure can provide a method of executing a modeling flow, the method including executing a modeling sequence having a first model and a second model, obtaining a first result from the first model, the first result being used as an input for the second model to obtain a second result from the second model, hashing data representing a first configuration associated with the first model and a second configuration associated with the second model to create a first hash and a second hash, respectively, storing the first result in a first location and the second result in a second location, the first hash pointing to the first location and the second hash pointing to the second location, respectively, receiving one or more configuration changes to the second model thereby creating a third configuration associated with the second model, hashing data representing the third configuration associated with the second model to create a third hash pointing to a third location in the database, receiving a request to rerun the modeling sequence having the first model and the second model, determining that the third location in the database is empty, determining that the first configuration is associated with the first model and that the first hash points to the first result in the first location, providing the first result to the second model without rerunning the first model, and executing the second model based on the first result.

These and other aspects of the present invention are described in the Detailed Description below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Figure 1:
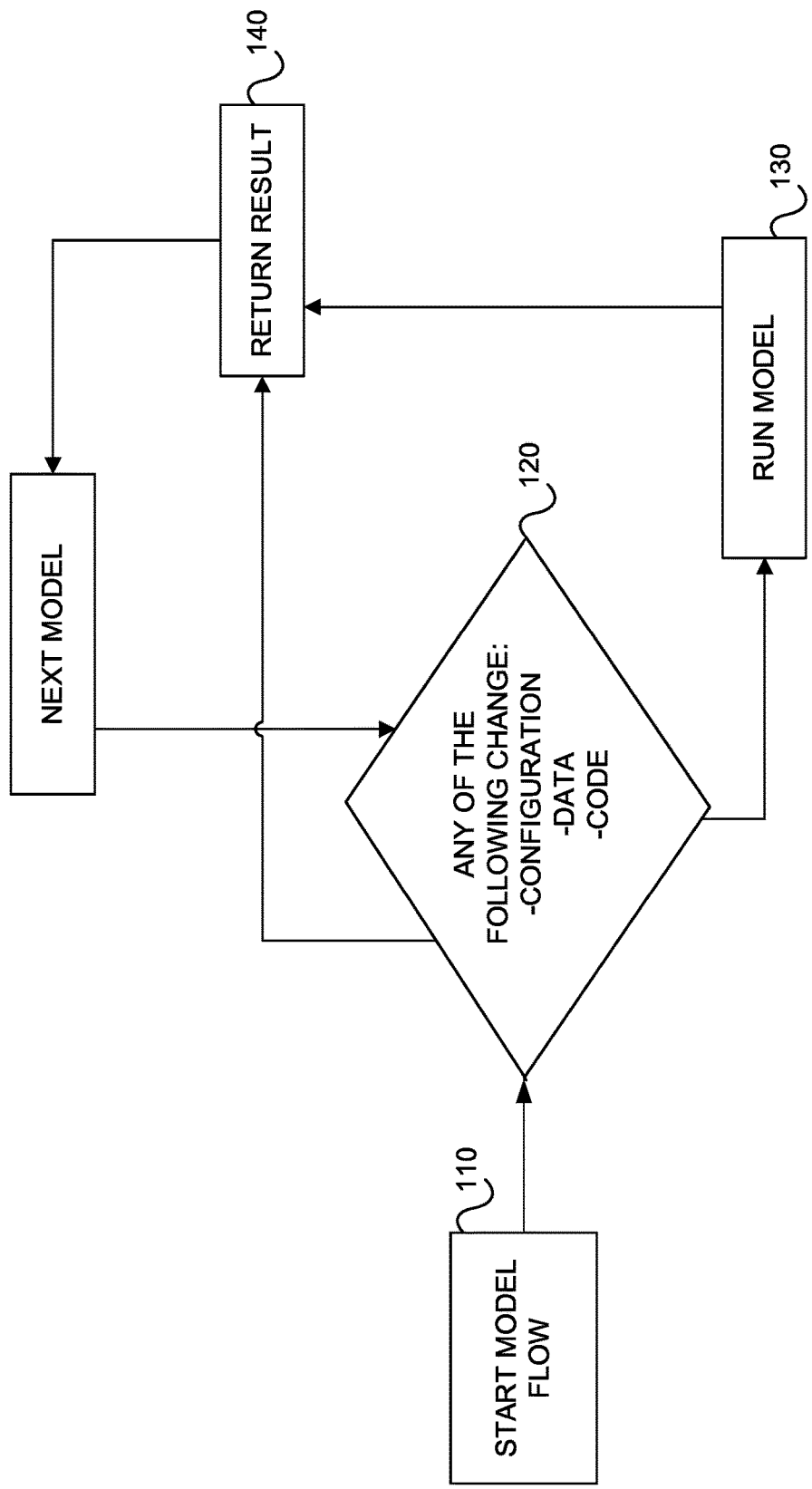
FIG. 1 is an example flow diagram of a method of executing a modeling flow in accordance with some examples of the present disclosure.

As described above, a problem with current predictive modeling is that sequential runs of models can consume, time, money, computing power, and computing resources (e.g., processor capacity) when needing to be run. Furthermore, costly re-runs of sequential models can add up even when changing minor configurations or parameters in only one of the models in the sequence. If one model changes, no matter how minor, the sequence needs to be re-run to achieve new results for the entire modeling sequence. This greatly increases the time and money spent on running sequential modeling sequences. It also heavily monopolizes computing resources for an unnecessary task.

Thus, the present invention reduces computing resources and computing power needed to complete a new prediction based on a change in input. With the growing scarcity of silicon and other rare earth metals needed to fabricate processors and other computer chips, preserving the operating life of in-use processors continues to be desirable. Furthermore, with the rise of "big data" and Big O classification, the industry of predictive modeling exhibits a growing demand for processing power, more powerful computer chips, and extended lifetimes of computer chips. The present disclosure can address this need by altering the high-stress and high-load methods of executing modeling sequence by reducing sequence runtime and sequence processing requirements.

Therefore, examples of the present disclosure can include systems and methods which can comprise executing a modeling sequence comprising a first model and a second model, obtaining a first result from the first model being used as an input for the second model to obtain a second result, hashing data representative of a first configuration and a second configuration to create a first hash and a second hash, respectively, storing the first result in a first location and the second result in a second location, receiving one or more configuration changes to the second model thereby creating a third configuration associated with the second model, hashing data representative of the third configuration to create a third hash, receiving a request to rerun the modeling sequence, determining that the first configuration is associated with the first model, and providing the first result to the second model without rerunning the first model.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

As shown in FIG. 1, an example user flow 100 can begin at block 110. In block 110, the user flow 100 can execute a modeling sequence. The modeling sequence can comprise any number of models and any type of models as desired. The modeling sequence can comprise a sequential modeling sequence (e.g., a first model can execute to obtain a result, and that result can feed into a second model as an input for the second model to execute and obtain a result). Alternatively, or in addition, the modeling sequence can comprise an assortment of models that are independent of each other.

In other words, the modeling sequence can comprise non-sequential modeling sequences. The user flow 100 can then proceed to block 120.

As shown in block 120, the user flow 100 can determine if the conditions of the model have changed for each model in the modeling sequence. For example, the user flow 100 can determine if the configuration data, the input data, and/or the source code for each model has changed. If any conditions of the model change, the user flow 100 can designate that model as changed. The user flow 100 can then proceed on to block 130 or block 140.

In block 130, for each model that is designated as changed, the user flow 100 can re-run the model with the new conditions or parameters. In such a manner, the user flow 100 can obtain new results based on different inputs or configurations. In block 140, for each model that is not designated as changed, the user flow 100 can simply return the previous output from the model obtained in block 110. In such a manner, models which have not been changed since the first execution in block 110 do not need to be re-run if their parameters and/or conditions remain the same. The user flow 100 can then return the outputs of all models in the modeling sequence.

Figure 2:
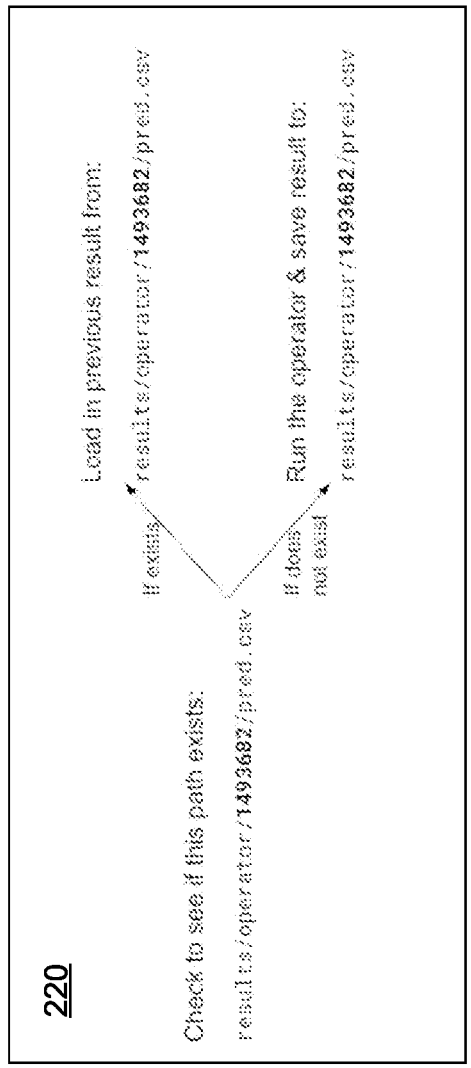
FIG. 2 illustrates a system diagram of a system for reducing modeling sequences in accordance with some examples of the present disclosure.
Figure 2:
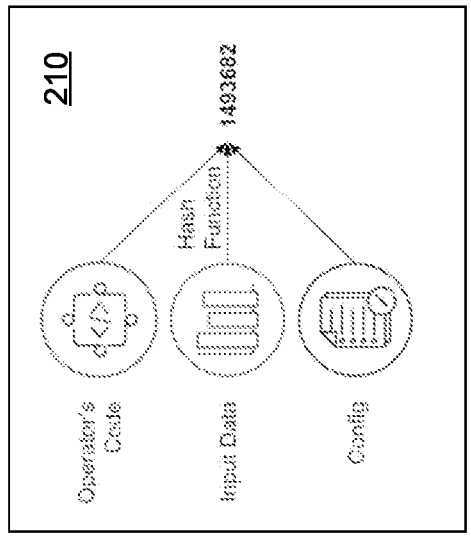

FIG. 2 illustrates another user flow 200 of the processes occurring between the end of block 110 and the beginning of block 140 in the user flow 100 shown in FIG. 1. The process shown in FIG. 2 is shown and described in a user flow 200 with respect to a single model; however, it is understood that the user flow 200 can be applied to each model in the modeling sequence, if desired.

As shown in block 210, the user flow 200 can hash data representative of the configuration associated with the model to create a hash. In other words, the configuration associated with the model can be hashed to create a representation of the complete configuration data. The hash can take various parameters of the model, such as configuration data, input data, and source code data, and condense the information into a single hash function. The hash function can be used to point to a location in a database. The user flow 200 can then store the result of the first run in that location in the database. The user flow 200 can then proceed on to block 210.

In block 210, corresponding to block 120 in the previous user flow 100, the user flow 200 can use the hash function to check if a result is stored in the corresponding location in the database. The user flow 200 can perform this check for each model in the sequence of models. If there is a result stored in the location pointed to by the hash function, the user flow 200 can simply return the result from the location. If there is not a result stored in the location (e.g., the location is empty) pointed to by the hash function, the user flow 200 can run that particular model and store the subsequent result in the empty location. In such a manner, the new result can be associated with the current hash function of the model.

Figure 3:
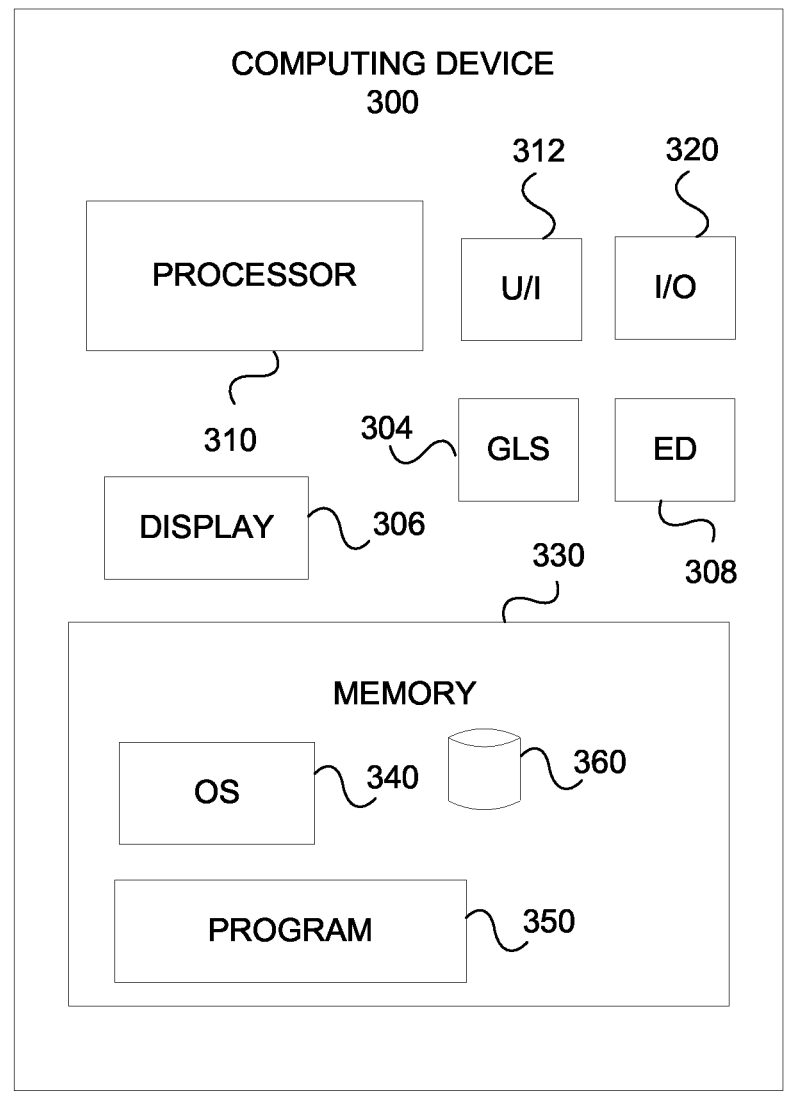
FIG. 3 illustrates a system diagram of a computing device in accordance with some examples of the present disclosure.

An example embodiment of a computing device 300 which can be used to execute or in conjunction with the processes, systems, and methods disclosed herein is shown in more detail in FIG. 3. While FIG. 3 is illustrated and described with respect to the computing device 300, it is to be understood that the example of the computing device 300 is merely illustrative, and that the illustrations within FIG. 3 can correspond to one or more components of other general-purpose computers, cloud systems, servers, and the like.

As shown, the computing device 300 can include a processor 310; an I/O device 320; a memory 330 containing an OS 340; a storage device 360, which can be any suitable repository of data and can include a database with any number of locations; and a program 350. In some examples, the computing device 300 can include components such as an accelerometer; a gyroscope; a GLS 304 for determining the geographic location of the computing device 300; a display 306 for displaying content such as text messages, images, and selectable buttons/icons/links; an environmental data ("ED") sensor 308 for obtaining environmental data including audio and/or visual information; a U/I device 312 for receiving user input data, such as data representative of a click, a scroll, a tap, a press, or typing on an input device that can detect tactile inputs; a display; a microphone and/or an image capture device, such as a digital camera. In some examples, the computing device 300 can include a transceiver. In some examples, the computing device 300 can further include a peripheral interface, a mobile network interface in communication with the processor 310, a bus configured to facilitate communication between the various components of the computing device 300, and/or a power source configured to power one or more components of the computing device 300.

While the following methods may be described with reference to a particular contextualized review system, it is understood that one or more method steps or whole methods can be performed by other contextualized review systems disclosed herein, other systems, general-purpose computers, computer operators, and the like.

Figure 4:
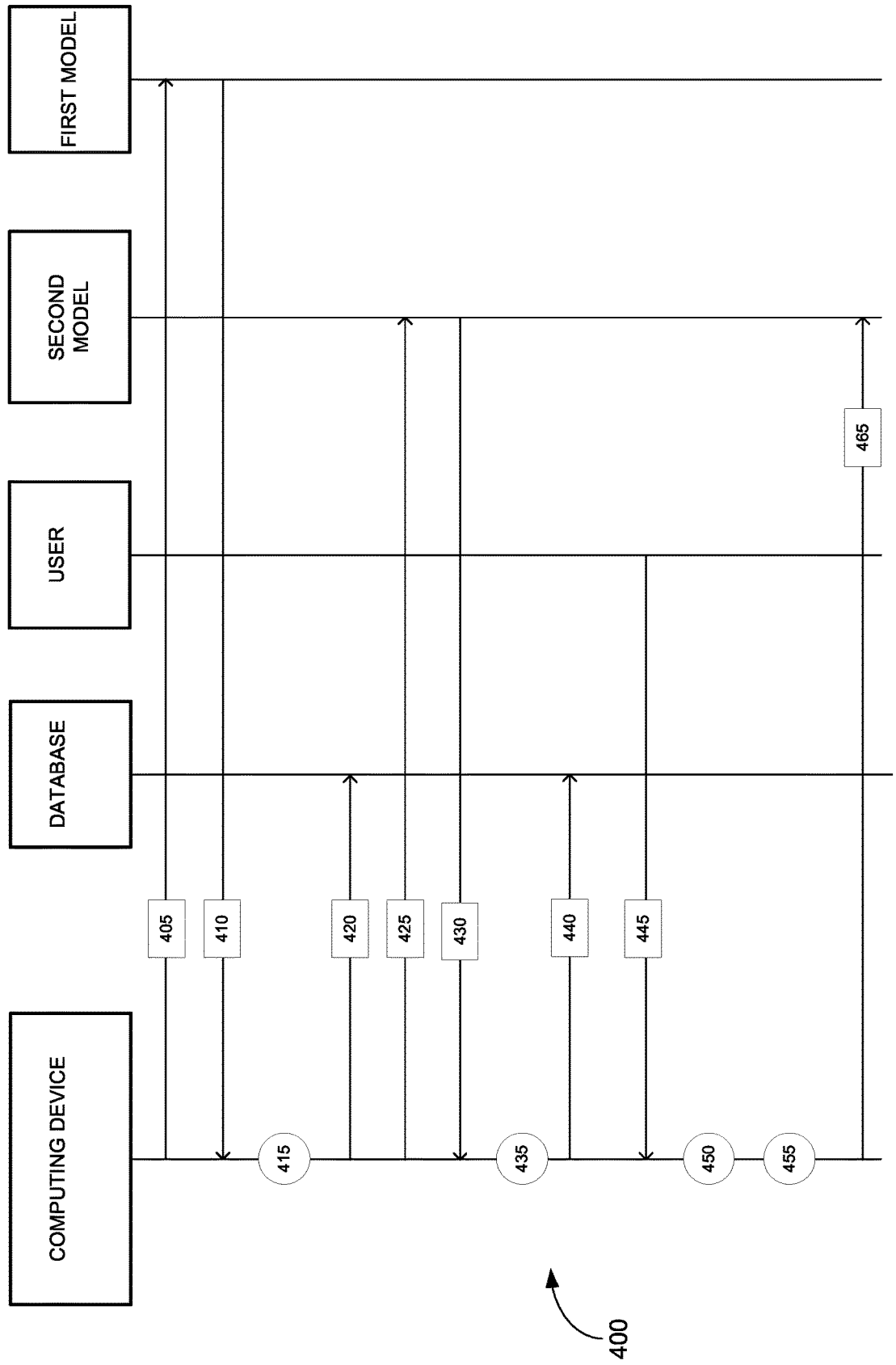
FIG. 4 illustrates a timing diagram for a method of executing a modeling flow in accordance with some examples of the present disclosure.

FIG. 4 illustrates an example timing diagram 400 for executing a modeling flow. As shown, the computing device 300 can initiate a model run. As part of the model run, the computing device 300 can hash a first model configuration and a second model configuration. Upon determining that the locations pointed to by the hash of the first model configuration and a second model configuration are empty, the computing device can execute 405 the modeling sequence comprising the first model 405. The first model can obtain 410 a first result.

Subsequently, the computing device 300 can hash 415 data representing a first configuration associated with the first model to create a first hash. As described above, the hash can comprise configuration data, input data, and source code data for the first model. As would be appreciated, the configuration data, input data, and source code data in combination can indicate a configuration for any given model.

The computing device 300 can store 420 the first result in a database. The first result can be stored in a first location. The first hash can point to the first location storing the first result. The first hash, therefore, can define a file path to access the first location. In other words, the first location is "occupied" by the first result.

Upon determining that the location pointed to by the hash of the second model configuration is empty, the computing device can execute 425 the modeling sequence comprising the second model 410. The second model can obtain 430 a first result. The second model can also be provided the first result 420 from the first model to be used as an input for the second model. As desired, this input can also be hashed in the second hash.

Subsequently, the computing device 300 can hash 435 data representing a second configuration associated with the second model to create a second hash. As described above, the hash can comprise configuration data, input data, and source code data for the second model. As would be appreciated, the configuration data, input data, and source code data in combination can indicate a configuration for any given model.

The computing device 300 can store 440 the second result in a database. The second result can be stored in a second location. The second hash can point to the second location storing the second result. The second hash, therefore, can define a file path to access the second location. In other words, the second location is "occupied" by the second result.

Then, the computing device 300 can receive 445 one or more configuration changes from a user. The one or more configuration changes can be changes to the second model. The user can thereby create a third configuration associated with the second model. As described above, because the configuration data, input data, and source code data in combination can indicate a configuration for any given model, a change to any therein can define a configuration change to the entire model.

Responsive to receiving the one or more configuration changes, the computing device 300 can hash 450 data representing the third configuration associated with the second model to create a third hash. Because the third hash is associated with the second model, the third hash can thereby point do a different location than the second hash which was previously associated with the second model. The third hash can point to a third location in the database. As would be appreciated, the third location in the database, as of yet, can be empty and distinct from the first location and the second location.

For each model, the computing device 300 can hash the configurations of the models in the modeling sequence and check the locations pointed to by the hashes for a prior result. As described above, the first model, being unchanged, would have a hash pointing to the first location and the first result. The computing device 300 can determine 455 that the third location in the database is empty based on the file path pointed to by the third hash. This can indicate a configuration change occurred. Similarly, the computing device can determine that the first hash points to the first result in the first location. This can indicate that the first configuration remains associated with the first model.

The computing device 300 can then provide 465 the first result to the second model without rerunning the first model. In such a manner, the second model can be re-run with the new, third configuration without having to re-run the first model in the old, first configuration. The computing device 300 can then execute the second model based on the first result.

Furthermore, the configuration change can continue to propagate through the modeling sequence. For example, the execution of the second model in the third configuration can yield a third result. The third result can be classified as an input to a third model. Based on the third result input, the computing device 300 can create a fourth configuration associated with the third model. As with the first model and the second model, the computing device 300 can hash the data representing the fourth configuration associated with the third model. The fourth hash can point to a fourth location in the database. Upon determining that the fourth location pointed to by the fourth hash is empty, the computing device 300 can execute the third model to obtain a fourth result, which can be stored in the fourth location.

As described above, the timing diagram 400 can comprise additional steps or flows not explicitly shown or depicted. A person of ordinary skill in the art would understand that any of the process or method steps described herein could be performed by or used in conjunction with the timing diagram 400.

Figure 5:
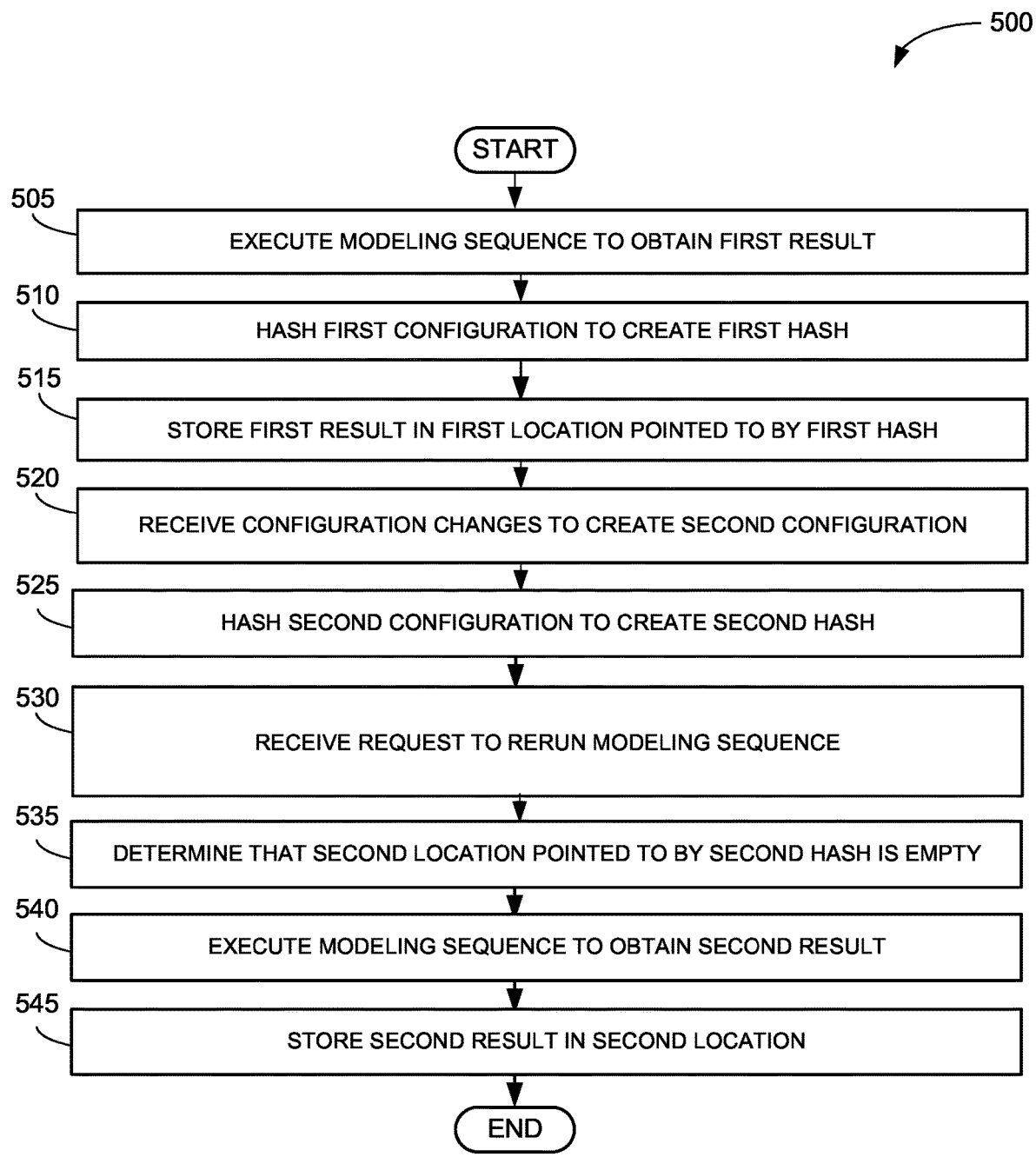
FIG. 5 illustrates a flowchart of a method of reducing modeling sequences in accordance with some examples of the present disclosure.

FIG. 5 illustrates a flowchart of an example method 500 of reducing modeling sequences. As shown in block 505, the computing device 300 can execute a modeling sequence to obtain a first result. The modeling sequence can comprise a first model. The first model can be any model configured to return a result based on a set of parameters as desired. The method 500 can then proceed on to block 510.

In block 510, the computing device 300 can hash data to create a first hash. The data can be representative of a first configuration of the first model. For instance, the first hash can include a hash based on the configuration data, a hash based on the input data, and a hash based on the source code data. The source code data can include data representative of the version of the source code. As would be appreciated, the version number of a model will change each time the model's source code is updated. The input data and the configuration data can include for instance, input conditions, model parameters, or model constraints. If the first model imports a library, the hashed data can also include data representative of the version of the library. The various hashed data can be concatenated or hashed into a single hashed string. As would be appreciated, part of the model's source code indicates what libraries that model needs. If any of the model's code changes (including the definitions of what libraries it needs), then there would be a new version of the model. The method 500 can then proceed on to block 515.

In block 515, the computing device 300 can store the first result in a first location in a database. The first hash can point to the first location in the database. For instance, the first hash can define a folder path to the first location in which the first result is stored. In such a manner, the first result can be associated with the configuration (e.g., the hash) of the first model from the time the first result was obtained. The method 500 can then proceed on to block 520.

In block 520, the computing device 300 can receive one or more configuration changes to the first model from a user. The configuration changes can include, for example, a change to the input data, a change to the model parameters, a change to the source code of the first model, a change to the version of a library, a change to the model constraints, and the like. The one or more configuration changes can thereby create a second configuration of the first model. The second configuration is, therefore, separate from the first configuration, and may return a different result than the first configuration. The method 500 can then proceed on to block 525.

In block 525, the computing device 300 can hash the second configuration associated with the first model to create a second hash. The second hash can include data representative of the second configuration. In such a manner, the computing device 300 can ensure the hash is associated with the most recent configuration of the first model. The second hash can point to a second location in the database (e.g., a folder path to the second location). As would be appreciated, because the second configuration of the first model has not been executed, there is no result obtained or stored in the second location. The method 500 can then proceed on to block 530.

In block 530, the computing device 300 can receive a request from the user to rerun the modeling sequence. The request can be an affirmative action by the user to request a rerun, or the request can be an automatic action received in response to the one or more configuration changes. The method 500 can then proceed on to block 535.

In block 535, the computing device 300 can determine that the second location in the database is empty. The computing device 300 can make this determination by following the path of the second hash (e.g., the folder path to the second location). The method 500 can then proceed on to block 540.

In block 540, the computing device 300 can execute the modeling sequence comprising the first model to obtain a second result. The second result can be obtained due to the second configuration rather than the first configuration. The method 500 can then proceed on to block 545.

In block 545, the computing device 300 can store the second result in the second location in the database. In such a manner, the second result, which was obtained by running the second configuration, can be stored in the location pointed to by the second hash. Additionally, because the second hash is representative of the second configuration, the second result can thereby be associated with the second hash (e.g., the folder path). Accordingly, if the first model is requested to be rerun without receiving additional configurations such that the second configuration is changed, the second result can simply be retrieved from the second location (via the second hash). The method 500 can terminate after block 545. However, the method 500 can also proceed to other method steps described herein but not explicitly shown.

Figure 6:
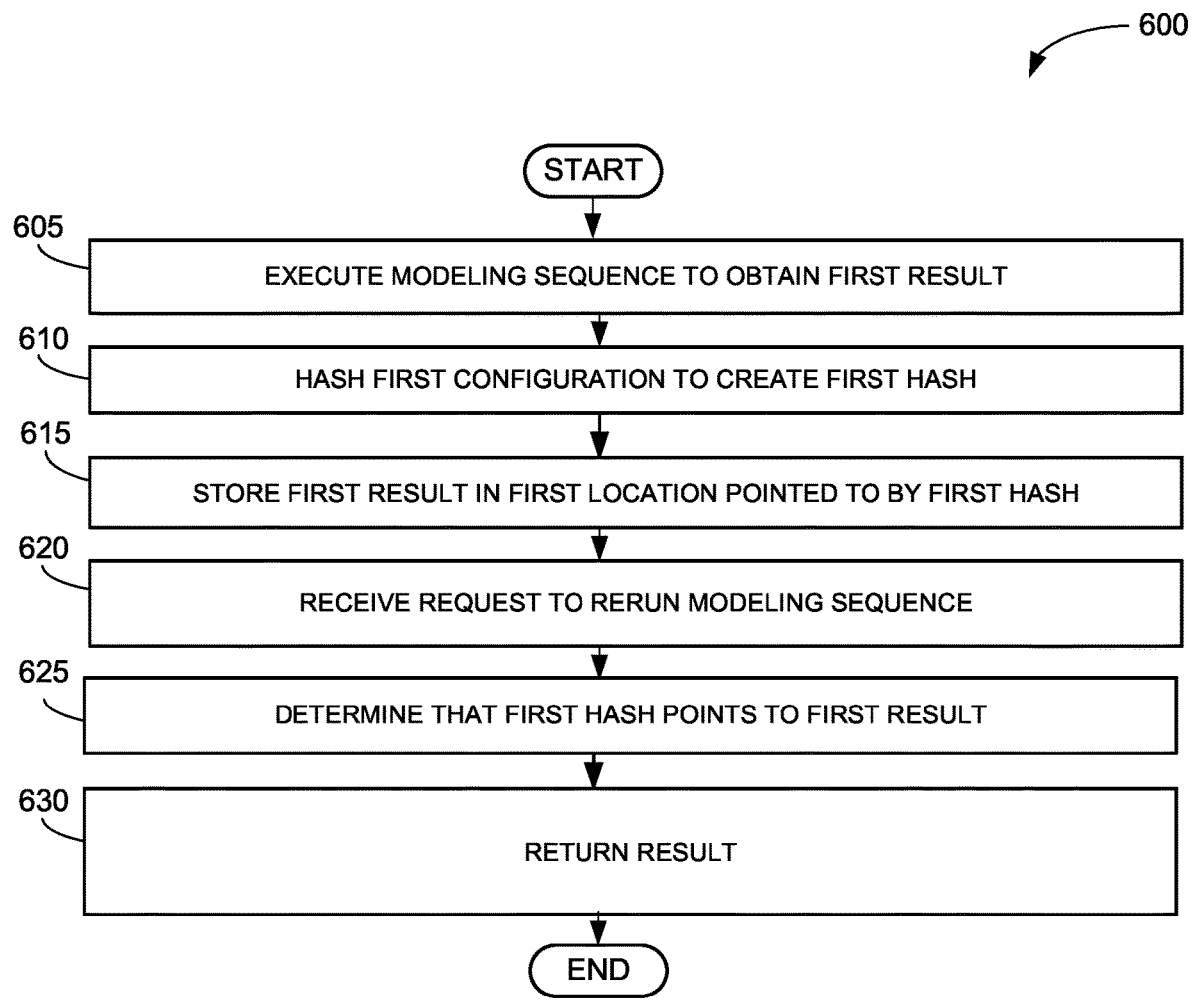
FIG. 6 illustrates a flowchart of another method of reducing modeling sequences in accordance with some examples of the present disclosure.

FIG. 6 illustrates a flowchart of an example method 600 of reducing modeling sequences. As shown, As shown in block 605, the computing device 300 can execute a modeling sequence to obtain a first result. The modeling sequence can comprise a first model. The first model can be any model configured to return a result based on a set of parameters as desired. The method 600 can then proceed on to block 610.

In block 610, the computing device 300 can hash data to create a first hash. The data can be representative of a first configuration of the first model. For instance, the first hash can include a hash based on the configuration data, a hash based on the input data, and a hash based on the source code data. The source code data can include data representative of the version of the source code. The input data and the configuration data can include for instance, input conditions, model parameters, or model constraints. If the first model imports a library, the hashed data can also include data representative of the version of the library. The various hashed data can be concatenated or hashed into a single hashed string. The method 600 can then proceed on to block 615.

In block 615, the computing device 300 can store the first result in a first location in a database. The first hash can point to the first location in the database. For instance, the first hash can define a folder path to the first location in which the first result is stored. In such a manner, the first result can be associated with the configuration (e.g., the hash) of the first model from the time the first result was obtained. The method 600 can then proceed on to block 620.

In block 620, the computing device 300 can receive a request from a user to rerun the modeling sequence. The request can be an affirmative action by the user to request a rerun, or the request can be an automatic action received in response to the one or more configuration changes. The method 600 can then proceed on to block 635.

In block 625, the computing device 300 can determine that the first hash points to the first location and, therefore, the first result. As such, because the first model remains in the first configuration, the computing device 300 can use the first hash to guide it to the first location in the database, where the first result resides. In such a manner, the result of the first model can be returned without needing to rerun the first model (when no configuration changes occur). The method 600 can then proceed on to block 630.

In block 630, the computing device 300 can return the first result to the user. For example, the first result can be displayed on the computing device (e.g., on the display 306). The displaying can be as a result of retrieving the first result from the database. The method 600 can terminate after block 630. However, the method 600 can also proceed to other method steps described herein but not explicitly shown.

Figure 7:
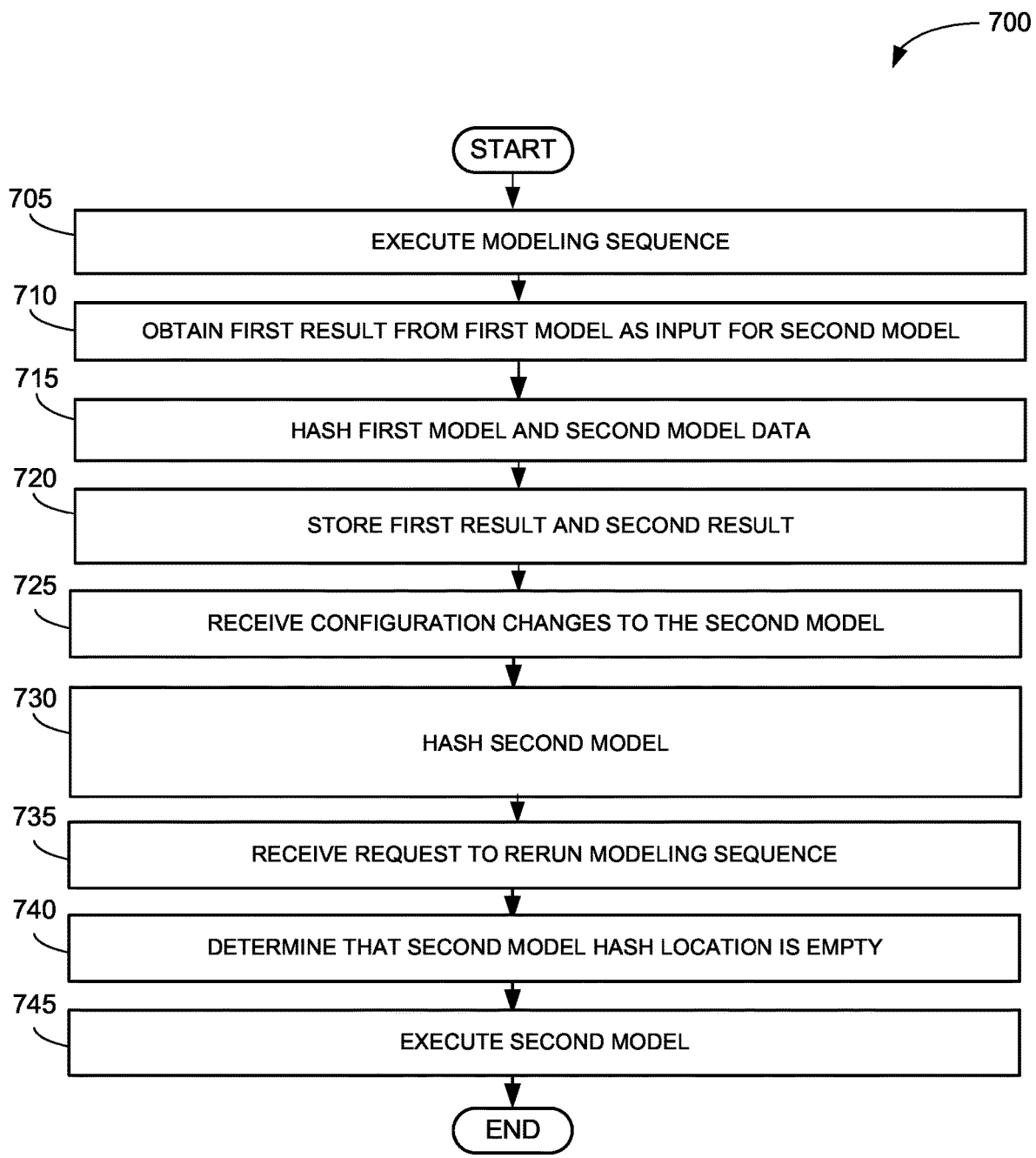
FIG. 7 illustrates a flowchart of a method of executing a modeling flow in accordance with some examples of the present disclosure.

FIG. 7 illustrates a flowchart of an example method 700 if executing a modeling flow. As shown in block 705, the computing device 300 can execute a modeling sequence to obtain a first result. The modeling sequence can comprise a first model and a second model. The first model and the second model can be any model configured to return a result based on a set of parameters as desired. The method 700 can then proceed on to block 710.

In block 710, the computing device 300 can obtain a first result from the first model. The first result can be used as an input for the second model to obtain a second result. In other words, the modeling sequence can comprise a sequential flow of the first model and the second model. The second model can depend on the results of the first model. The method 700 can proceed on to block 715.

In block 715, the computing device 300 can hash data to create a first hash and a second hash. The data can be representative of a first configuration of the first model and a second configuration of the second model. For example, the first hash can include a hash based on the configuration data, a hash based on the input data, and a hash based on the source code data. The source code data can include data representative of the version of the source code. The input data and the configuration data can include for instance, input conditions, model parameters, or model constraints. If the first model or second model imports a library, the hashed data can also include data representative of the version of the library. The various hashed data can be concatenated or hashed into a single hashed string for each of the first model and the second model. The method 700 can then proceed on to block 720.

In block 720, the computing device 300 can store the first result in a first location and the second result in a second location in a database. The first hash can point to the first location in the database. The second hash can point to the second location in the database. For example, the first hash can define a folder path to the first location in which the first result is stored. Similarly, the second hash can define a folder path to the second location in which the second result is stored. In such a manner, the first result can be associated with the configuration (e.g., the hash) of the first model from the time the first result was obtained. Furthermore, the second result can be associated with the configuration (e.g., the hash) of the second model from the time the second result was obtained. The method 700 can then proceed on to block 725.

In block 725, the computing device 300 can receive one or more configuration changes to the second model from a user. The configuration changes can include, for example, a change to the input data, a change to the model parameters, a change to the source code of the second model, a change to the version of a library, a change to the model constraints, and the like. The one or more configuration changes can thereby create a third configuration of the second model. The third configuration is, therefore, separate from the second configuration, and may return a different result than the second configuration. The method 700 can then proceed on to block 730.

In block 730, the computing device 300 can hash the third configuration associated with the second model to create a third hash. The third hash can include data representative of the third configuration. In such a manner, the computing device 300 can ensure the hash is associated with the most recent configuration of the second model. The third hash can point to a third location in the database (e.g., a folder path to the third location). As would be appreciated, because the third configuration of the second model has not been executed, there is no result obtained or stored in the third location. The method 700 can then proceed on to block 735.

In block 735, the computing device 300 can receive a request from the user to rerun the modeling sequence. The request can be an affirmative action by the user to request a rerun, or the request can be an automatic action received in response to the one or more configuration changes. The method 700 can then proceed on to block 740.

In block 740, the computing device 300 can determine that the third location in the database is empty. The computing device 300 can make this determination by following the path of the third hash (e.g., the folder path to the third location). The computing device 300 can also determine that the first hash points to the first location and, therefore, the first result. As such, because the first model remains in the first configuration, the computing device 300 can use the first hash to guide it to the first location in the database, where the first result resides. In such a manner, the result of the first model can be returned without needing to rerun the first model (when no configuration changes occur). After retrieving the first result, the first result can be provided to the second model as an input without needed to rerun the first model. In such a manner, the time and computing power needed to rerun the entire modeling sequence is reduced. The method 700 can then proceed on to block 745.

In block 745, the computing device 300 can execute the second model based on the first result as the input. The computing device 300 can then obtain a third result from the second model. The third result can be obtained due to the third configuration rather than the second configuration.

Furthermore, the configuration change can continue to propagate through the modeling sequence. For example, the execution of the second model in the third configuration can yield a third result. The third result can be classified as an input to a third model. Based on the third result input, the computing device 300 can create a fourth configuration associated with the third model. As with the first model and the second model, the computing device 300 can hash the data representing the fourth configuration associated with the third model. The fourth hash can point to a fourth location in the database. Upon determining that the fourth location pointed to by the fourth hash is empty, the computing device 300 can execute the third model to obtain a fourth result, which can be stored in the fourth location. The method 700 can terminate after block 745. However, the method 700 can also proceed to other method steps described herein but not explicitly shown.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

Exemplary Use Cases

The following exemplary use cases describe examples of a typical user flow pattern. They are intended solely for explanatory purposes and not limitation.

A user can execute a loss forecasting modeling sequence. The loss forecasting modeling sequence can comprise a series of sequential models where the result of one model is used as an input to the next model in the sequence, and so on. After the first run or execution, the user can obtain results from the loss forecasting modeling sequence. The configurations of each model (e.g., input parameters, constraints, source code version, etc.) can be hashed into a hashed string representing the configuration for each model during the first run. Each hash can correspond (e.g., point) to a location in a database where the results of each model from the first run are stored.

The user can then decide to tune or tweak the loss forecasting modeling sequence by changing the parameters of one of the models in the sequence. The change could include changing the constraints of the model. Because the configuration of that particular model changed, the hash corresponding to that model can also change (due to the change in constraint data). The new hash can point to a new location in the database, but the old result from the first result is still stored in the original location pointed to by the (now) obsolete hash.

After tweaking the model parameters, the user can rerun the modeling sequence. For each model that remains unchanged, the original hashes will point to the locations in the database where the models can return the original results without being rerun. However, once the loss forecasting modeling sequence reaches the model with changed constraints, the location in the database will be empty because the new hash for the new configuration points to a new location. As such, the loss forecasting modeling sequence can rerun the model with changed constraints to obtain a new result. Then, every model beyond the changed model in the sequence can be rerun after being fed the input from the changed model. In such a manner, only models effected by the configuration change can be rerun, while the unchanged models do not need to be rerun. This saves costs in both computing power and time.

What is claimed is:

1. A method of reducing modeling sequences, the method comprising:
   executing, by a computing device, a modeling sequence comprising a first model to obtain a first result;
   hashing data representative of a first configuration associated with the first model to create a first hash, wherein the first model imports a library, and the data representative of the first configuration comprises input data, configuration data, and source code data, and wherein creating the first hash comprises hashing the input data, the configuration data, and the source code data into a hashed string;
   storing, in a database, the first result in a first location, the first hash pointing to the first location in the database;
   receiving, from a user at the computing device, one or more configuration changes to the first model thereby creating a second configuration associated with the first model, the one or more configuration changes comprising at least a version change to the library;
   hashing data representative of the second configuration associated with the first model to create a second hash pointing to a second location in the database, the hashing data representative of the second configuration comprising hashing version data associated with the library;
   receiving, at the computing device by the user, a request to rerun the modeling sequence comprising the first model, wherein the request is an automatic action received in response to the one or more configuration changes;
   determining, based on the second hash, that the second location in the database is empty;
   executing, by the computing device, the modeling sequence comprising the first model to obtain a second result;
   storing, in the database, the second result in the second location; and
   providing the second result as an input to a second model to obtain a third result.

2. The method of claim 1, wherein the input data and the configuration data comprise one or more of: input conditions, model parameters, or model constraints.

3. The method of claim 1, wherein the modeling sequence comprises the first model and one or more forecasting models.

4. A system of reducing modeling sequences comprising:
   one or more processors;
   memory in communication with the one or more processors and storing instructions that are configured to cause the system to:
   execute, by a computing device, a modeling sequence comprising a first model to obtain a first result;
   hash data representative of a first configuration associated with the first model to create a first hash, wherein the first model imports a library, and the data representative of the first configuration comprises input data, configuration data, and source code data, and wherein creating the first hash comprises hashing the input data, the configuration data, and the source code data into a hashed string;
   store, in a database, the first result in a first location, the first hash pointing to the first location in the database;
   receive, from a user at the computing device, one or more configuration changes to the first model thereby creating a second configuration associated with the first model, the one or more configuration changes comprising at least a version change to the library;
   hash data representative of the second configuration associated with the first model to create a second hash pointing to a second location in the database, the hash data representative of the second configuration comprising hashing version data associated with the library;
   receive, at the computing device by the user, a request to rerun the modeling sequence comprising the first model, wherein the request is an automatic action received in response to the one or more configuration changes;
   determine, based on the second hash, that the second location in the database is empty;
   execute, by the computing device, the modeling sequence comprising the first model to obtain a second result;
   store, in the database, the second result in the second location; and
   provide the second result as an input to a second model to obtain a third result.

5. The system of claim 4, wherein the input data and the configuration data comprise one or more of: input conditions, model parameters, or model constraints.

6. The system of claim 4, wherein the modeling sequence comprises the first model and one or more forecasting models.

7. A non-transitory computer readable medium storing program instructions that when executed by one or more processors cause a computing device to perform the steps of:
   executing, by the computing device, a modeling sequence comprising a first model to obtain a first result;
   hashing data representative of a first configuration associated with the first model to create a first hash, wherein the first model imports a library, and the data representative of the first configuration comprises input data, configuration data, and source code data, and wherein creating the first hash comprises hashing the input data, the configuration data, and the source code data into a hashed string;
   storing, in a database, the first result in a first location, the first hash pointing to the first location in the database;
   receiving, from a user at the computing device, one or more configuration changes to the first model thereby creating a second configuration associated with the first model, the one or more configuration changes comprising at least a version change to the library;
   hashing data representative of the second configuration associated with the first model to create a second hash pointing to a second location in the database, the hashing data representative of the second configuration comprising hashing version data associated with the library;

receiving, at the computing device by the user, a request to rerun the modeling sequence comprising the first model, wherein the request is an automatic action received in response to the one or more configuration changes;

determining, based on the second hash, that the second location in the database is empty;

executing, by the computing device, the modeling sequence comprising the first model to obtain a second result;

storing, in the database, the second result in the second location; and providing the second result as an input to a second model to obtain a third result.

8. The non-transitory computer readable medium of claim 7, wherein the input data and the configuration data comprise one or more of: input conditions, model parameters, or model constraints.

9. The non-transitory computer readable medium of claim 7, wherein the modeling sequence comprises the first model and one or more forecasting models.

\* \* \* \* \*